US009507523B1

(12) United States Patent
Mullendore et al.

(10) Patent No.: US 9,507,523 B1
(45) Date of Patent: Nov. 29, 2016

(54) METHODS, DEVICES AND SYSTEMS FOR VARIABLE SIZE LOGICAL PAGE MANAGEMENT IN A SOLID STATE DRIVE

(71) Applicants: Western Digital Technologies, Inc., Irvine, CA (US); Skyera, LLC, San Jose, CA (US)

(72) Inventors: Rodney N. Mullendore, San Jose, CA (US); Radoslav Danilak, Cupertino, CA (US); Justin Jones, Burlingame, CA (US); Andrew J. Tomlin, San Jose, CA (US)

(73) Assignees: Western Digital Technologies, Inc., Irvine, CA (US); Skyera, LLC, San Jose, CA (US)

( * ) Notice: Subject to any disclaimer, the term of this patent is extended or adjusted under 35 U.S.C. 154(b) by 1043 days.

(21) Appl. No.: 13/651,313

(22) Filed: Oct. 12, 2012

(51) Int. Cl.
*G06F 12/00* (2006.01)
*G06F 3/06* (2006.01)

(52) U.S. Cl.
CPC ........... *G06F 3/0604* (2013.01); *G06F 3/0638* (2013.01); *G06F 3/0679* (2013.01); *G06F 2212/7201* (2013.01)

(58) Field of Classification Search
CPC .. G06F 3/0604; G06F 3/0638; G06F 3/0679; G06F 2212/7201
See application file for complete search history.

(56) References Cited

U.S. PATENT DOCUMENTS

| | | | |
|---|---|---|---|
| 6,856,556 B1 | 2/2005 | Hajeck | |
| 7,126,857 B2 | 10/2006 | Hajeck | |
| 7,363,421 B2 | 4/2008 | Di Sena et al. | |
| 7,412,585 B2 | 8/2008 | Uemura | |
| 7,430,136 B2 | 9/2008 | Merry, Jr. et al. | |
| 7,441,067 B2 | 10/2008 | Gorobets et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,509,471 B2 | 3/2009 | Gorobets | |
| 7,596,643 B2 | 9/2009 | Merry, Jr. et al. | |
| 7,610,438 B2 | 10/2009 | Lee et al. | |
| 7,653,778 B2 | 1/2010 | Merry, Jr. et al. | |
| 7,685,337 B2 | 3/2010 | Merry, Jr. et al. | |

(Continued)

OTHER PUBLICATIONS

Written Opinion & International Search Report dated:Jan. 16, 2014 from Patent Application Serial No. PCT/US2013/062723 11 pages.

(Continued)

*Primary Examiner* — Kalpit Parikh
(74) *Attorney, Agent, or Firm* — Wilmer Cutler Pickering Hale and Dorr LLP

(57) ABSTRACT

A data storage device may comprise an array of flash memory devices comprising a plurality of blocks, each comprising a plurality of physical pages. A controller may be coupled to and configured to program and read data from the array responsive to host commands. The controller may be configured to store data in a plurality of logical pages (L-Pages) of different sizes, each associated with an L-Page number that is configured to enable the host to logically reference data stored in one or more of the physical pages; and maintain a logical-to-physical address translation map configured to enable the controller to determine a location, within one or more physical pages, of the data referenced by each L-Page number. The translation map may comprise a plurality of mapping entries arranged by L-Page numbers, each comprising a complete starting physical address of an L-Page within one of the physical pages.

36 Claims, 7 Drawing Sheets

(56) References Cited

U.S. PATENT DOCUMENTS

| | | |
|---|---|---|
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,745,277 B2 | 6/2014 | Kan |
| 2002/0044486 A1* | 4/2002 | Chan ............... G11C 16/08 365/185.33 |
| 2004/0088474 A1 | 5/2004 | Lin |
| 2004/0109376 A1 | 6/2004 | Lin |
| 2005/0144516 A1* | 6/2005 | Gonzalez ......... G06F 12/0246 714/6.13 |
| 2006/0155917 A1 | 7/2006 | Di Sena et al. |
| 2007/0016721 A1 | 1/2007 | Gay |
| 2007/0094445 A1 | 4/2007 | Trika et al. |
| 2007/0204128 A1 | 8/2007 | Lee et al. |
| 2007/0300037 A1 | 12/2007 | Rogers et al. |
| 2008/0104308 A1 | 5/2008 | Mo et al. |
| 2008/0256287 A1 | 10/2008 | Lee et al. |
| 2008/0282024 A1 | 11/2008 | Biswas et al. |
| 2009/0019218 A1 | 1/2009 | Sinclair et al. |
| 2009/0049229 A1 | 2/2009 | Honda et al. |
| 2009/0119353 A1 | 5/2009 | Oh et al. |
| 2009/0150599 A1 | 6/2009 | Bennett |
| 2009/0177931 A1 | 7/2009 | Song et al. |
| 2009/0222643 A1 | 9/2009 | Chu |
| 2009/0240873 A1 | 9/2009 | Yu et al. |
| 2009/0241008 A1 | 9/2009 | Kim et al. |
| 2009/0241009 A1 | 9/2009 | Kong et al. |
| 2009/0259805 A1 | 10/2009 | Kilzer et al. |
| 2009/0292972 A1 | 11/2009 | Seol et al. |
| 2009/0327589 A1 | 12/2009 | Moshayedi |
| 2010/0030999 A1 | 2/2010 | Hinz |
| 2010/0174847 A1* | 7/2010 | Paley ............... G06F 12/0246 711/103 |
| 2010/0174849 A1 | 7/2010 | Walston et al. |
| 2010/0174851 A1 | 7/2010 | Leibowitz et al. |
| 2010/0211851 A1 | 8/2010 | Dixon |
| 2010/0241928 A1 | 9/2010 | Kim et al. |
| 2010/0250793 A1 | 9/2010 | Syu |
| 2010/0268871 A1 | 10/2010 | Lee et al. |
| 2010/0306451 A1 | 12/2010 | Johnson |
| 2011/0055458 A1 | 3/2011 | Kuehne |
| 2011/0066788 A1 | 3/2011 | Eleftheriou et al. |
| 2011/0072194 A1 | 3/2011 | Forhan et al. |
| 2011/0072333 A1 | 3/2011 | Kuo |
| 2011/0099321 A1 | 4/2011 | Haines et al. |
| 2011/0099323 A1 | 4/2011 | Syu |
| 2011/0099350 A1 | 4/2011 | Feldman et al. |
| 2011/0119464 A1 | 5/2011 | Karr et al. |
| 2011/0191566 A1 | 8/2011 | Takamiya et al. |
| 2011/0191654 A1 | 8/2011 | Rub |
| 2011/0225346 A1 | 9/2011 | Goss et al. |
| 2011/0252289 A1 | 10/2011 | Patapoutian et al. |
| 2011/0283049 A1 | 11/2011 | Kang et al. |
| 2011/0320915 A1 | 12/2011 | Khan |
| 2012/0023387 A1 | 1/2012 | Wang et al. |
| 2012/0072807 A1 | 3/2012 | Cornwell et al. |
| 2012/0173795 A1 | 7/2012 | Schuette et al. |
| 2012/0226887 A1 | 9/2012 | Culley et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |

OTHER PUBLICATIONS

U.S. Appl. No. 13/610,157, filed Aug. 24, 2012, to Mullendore et al., 34 pages.

* cited by examiner

| L-PAGE # | | | | E-PAGES NEEDED |
|---|---|---|---|---|
| L-Page 1 = | E-Page 1003 | Offset 800 | Len 1,624 | 1003, 1004 |
| L-Page 2 = | E-Page 1004 | Offset 400 | Len 696 | 1004 |
| L-Page 3 = | E-Page 1004 | Offset 1,120 | Len 4,096 | 1004, 1005, 1006 |
| L-Page 4 = | E-Page 1006 | Offset 1,144 | Len 3,128 | 1006, 1007, 1008 |

METHODS, DEVICES AND SYSTEMS FOR VARIABLE SIZE LOGICAL PAGE MANAGEMENT IN A SOLID STATE DRIVE

BACKGROUND

Due to the nature of flash memory in solid state drives (SSDs), data is typically programmed by pages and erased by blocks. A page in an SSD is typically 8-16 kilobytes (KB) in size and a block consists of a large number of pages (e.g., 256 or 512). Thus, a particular physical location in an SSD (e.g., a page) cannot be directly overwritten without overwriting data in pages within the same block, as is possible in a magnetic hard disk drive. As such, address indirection is needed. Conventional data storage device controllers, which manage the flash memory on data storage devices such as SSDs and interface with the host system, use a Logical to Physical (L2P) mapping system known as Logical Block Addressing (LBA) that is part of the flash translation layer (FTL). When new data comes in replacing older data already written, the data storage device controller causes the new data to be written in a new location and update the logical mapping to point to the new physical location. Since the old physical location no longer holds valid data, it will eventually need to be erased before it can be written again.

Conventionally, a large L2P map table maps logical entries to physical address locations on an SSD. This large L2P map table, which may reside in a volatile memory such as dynamic random access memory (DRAM), is usually updated as writes come in, and saved to non-volatile memory in small sections. For example, if random writing occurs, although the system may have to update only one entry, it may nonetheless have to save to the non-volatile memory the entire table or a portion thereof, including entries that have not been updated, which is inherently inefficient.

FIG. 1 shows aspects of a conventional Logical Block Addressing (LBA) scheme for an SSD. As shown therein, a map table 104 contains one entry for every logical block 102 defined for the data storage device's flash memory 106. For example, a 64 GB SSD that supports 512 byte logical blocks may present itself to the host as having 125,000,000 logical blocks. One entry in the map table 104 contains the current location of each of the 125,000,000 logical blocks in the flash memory 106. In a conventional SSD, a flash page holds an integer number of logical blocks (i.e., a logical block does not span across flash pages). In this conventional example, an 8 KB flash page would hold 16 logical blocks (of size 512 bytes). Therefore, each entry in the logical-to-physical map table 104 contains a field 108 identifying the flash die on which the logical block is stored, a field 110 identifying the flash block on which the logical block is stored, another field 112 identifying the flash page within the flash block and a field 114 identifying the offset within the flash page that identifies where the logical block data begins in the identified flash page. For example, a conventional 8 KB flash page 119 may hold 16 logical blocks of a constant predetermined size of, for example, 512 bytes. Therefore, each entry in the logical-to-physical map table 104 contains a Page Offset field that identifies the 512 byte "bucket" where a logical block's data begins in the flash page (e.g., at byte 512*Page Offset). For example, the data for logical block 4 begins within the current flash page at byte 512*4. Similarly, the data for logical block 11 begins within the current flash page at byte 512*11. Therefore, each conventional flash page 105 is configured to hold the data for a predetermined and invariant integer number of logical blocks. The size of each logical block is, therefore, fixed. Moreover, the data for each logical block is aligned with a 512 byte boundary. That is, the data for any given logical block conventionally must be aligned with the sector size boundaries (such as the 512 byte boundaries) within a flash page. Therefore, the data for a given logical block may not start or end at other than an integer multiple of the sector size, as illustrated at 116. This also implies that conventionally, the data for a logical block may not cross flash page boundaries 117, as shown at 118.

DETAILED DESCRIPTION

System Overview

Figure 1:
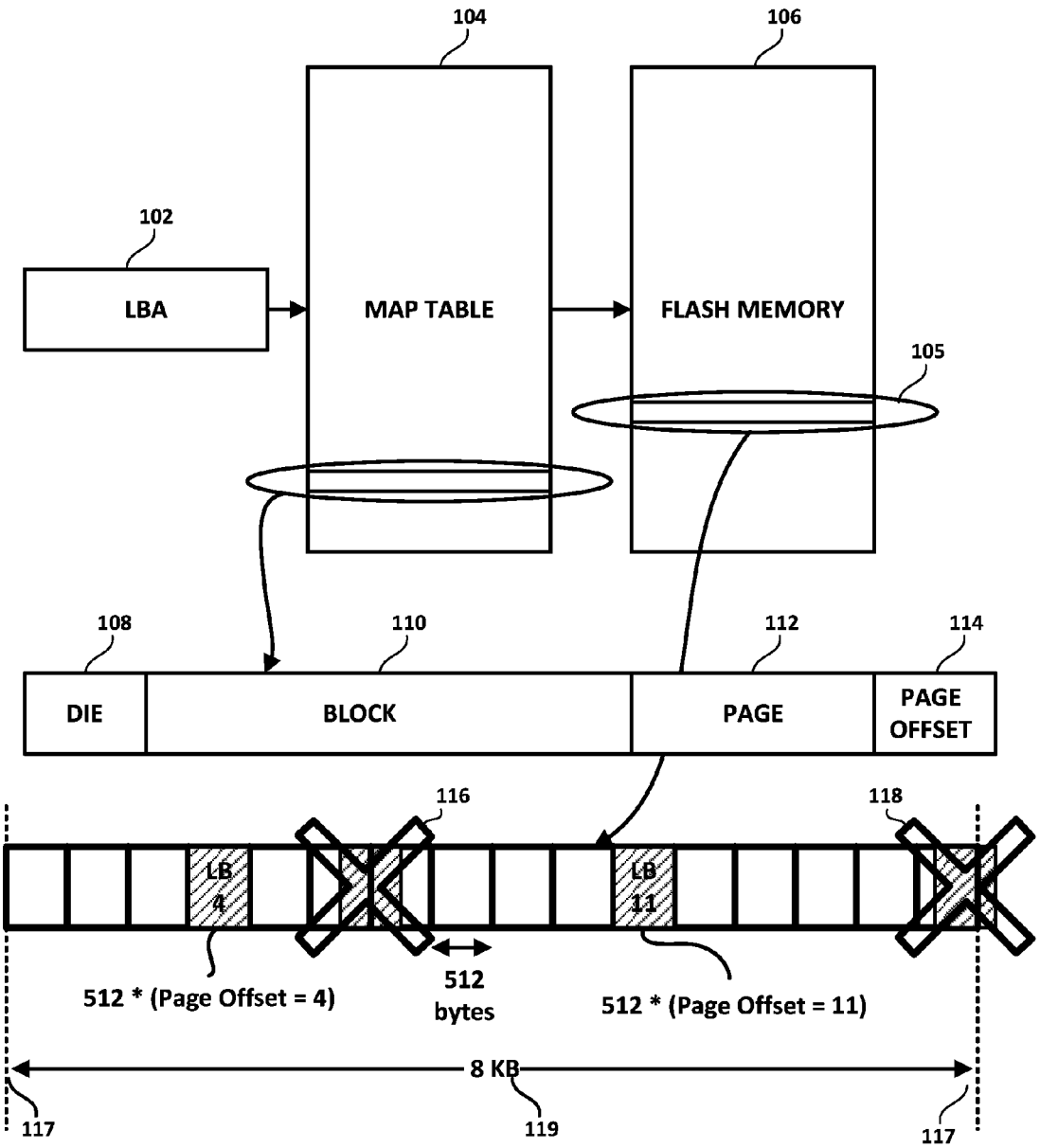
FIG. 1 shows aspects of a conventional Logical Block Addressing (LBA) scheme for SSDs.
Figure 2:
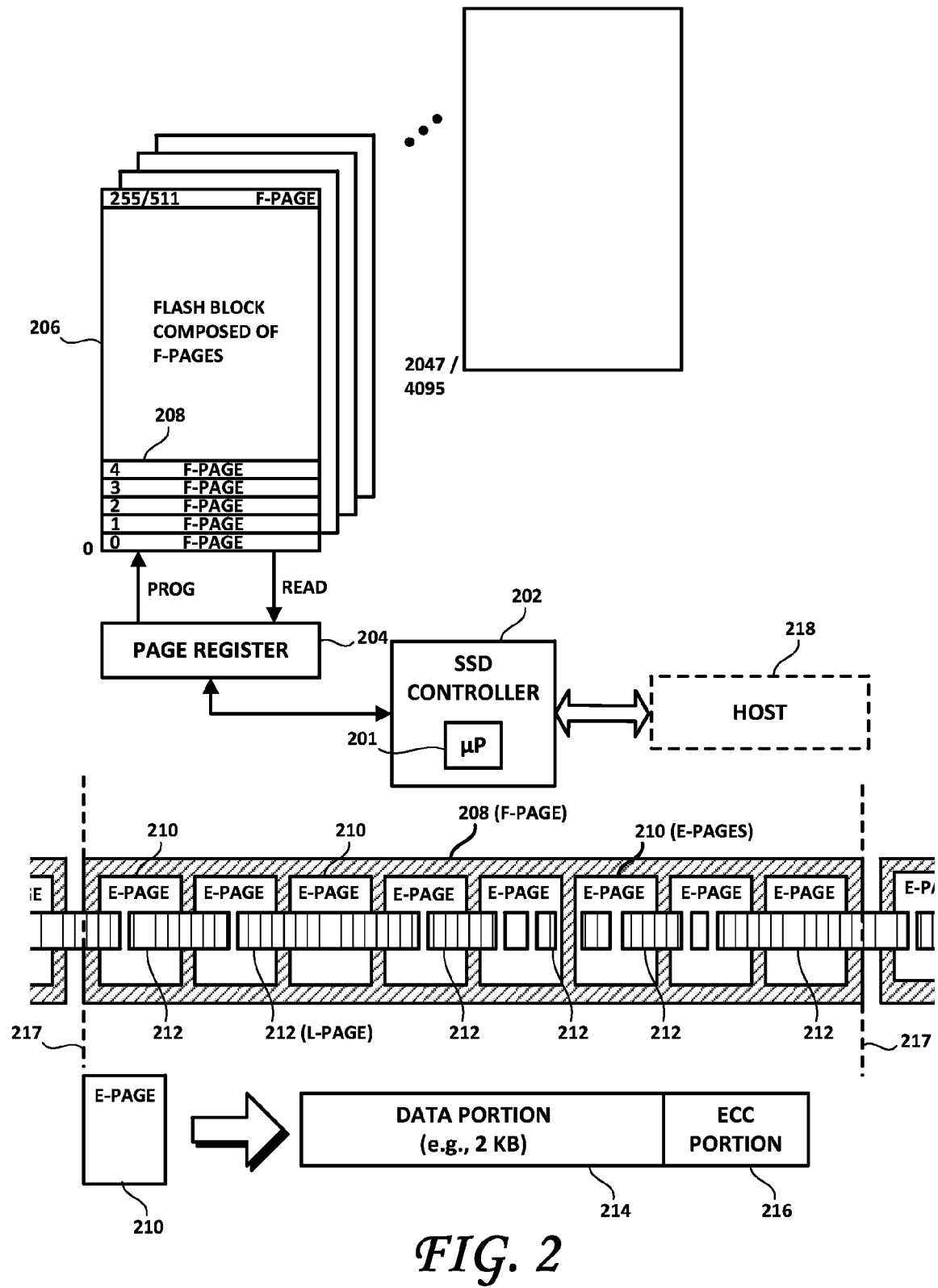
FIG. 2 is a diagram showing aspects of the physical and logical data organization of a data storage device according to one embodiment.

FIG. 2 is a diagram showing aspects of the physical and logical data organization of a data storage device according to one embodiment. In one embodiment, the data storage device is an SSD. In another embodiment, the data storage device is a hybrid drive including flash memory and rotating magnetic storage media. The disclosure is applicable to both SSD and hybrid implementations, but for the sake of simplicity the various embodiments are described with reference to SSD-based implementations. A data storage device controller 202 according to one embodiment may comprise one or more processors 201 and may be configured to be coupled to a host, as shown at reference numeral 218. The host 218 may utilize a logical block addressing (LBA) scheme. While the LBA size is normally fixed, the host can vary the size of the LBA dynamically. For example, the physical data storage device may be logically portioned to support partitions configured for LBAs of different sizes. However, such partitions are not required for the physical device to support LBAs of different sizes at the same time.

For example, the LBA size may vary by interface and interface mode. Indeed, while 512 bytes is most common, 4 KB is also becoming more common, as are 512+(520, 528 etc.) and 4 KB+ (4 KB+8, 4K+16 etc.) formats. As shown therein, the data storage device controller 202 may comprise or be coupled to a page register 204. The page register 204 may be configured to enable the controller 202 to read data from and store data to the data storage device. The controller 202 may be configured to program and read data from an array of flash memory devices responsive to data access commands from the host 218. While the description herein refers to flash memory generally, it is understood that the array of memory devices may comprise one or more of various types of non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The page register 204 may be configured to enable the controller 202 to read data from and store data to the array. According to one embodiment, the array of flash memory devices may comprise a plurality of non-volatile memory devices in dies (e.g., 128 dies), each of which comprises a plurality of blocks, such as shown at 206 in FIG. 2. Other page registers 204 (not shown), may be coupled to blocks on other dies. A combination of flash blocks, grouped together, may be called a Superblock or S-Block. In some embodiments, the individual blocks that form an S-Block may be chosen from one or more dies, planes or other levels of granularity. An S-Block, therefore, may comprise a plurality of flash blocks, spread across one or more dies, that are combined together. In this manner, the S-Block may form a unit on which the Flash Management System (FMS) operates. In some embodiments, the individual blocks that form an S-Block may be chosen according to a different granularity than at the die level, such as is the case when the memory devices include dies that are sub-divided into structures such as planes (i.e., blocks may be taken from individual planes). According to one embodiment, allocation, erasure and garbage collection may be carried out at the S-Block level. In other embodiments, the FMS may perform data operations according to other logical groupings such as pages, blocks, planes, dies, etc.

In turn, each of the flash blocks 206 may comprise a plurality of flash pages (F-Pages) 208. Each F-Page may be of a fixed size such as, for example, 16 KB. The F-Page, according to one embodiment, is the size of the minimum unit of program for a given flash device. As also shown in FIG. 2, each F-Page 208 may be configured to accommodate a plurality of physical pages, hereinafter referred to as E-Pages 210. The term "E-Page" refers to a data structure stored in flash memory on which an error correcting code (ECC) has been applied. According to one embodiment, the E-Page 210 may form the basis for physical addressing within the data storage device and may constitute the minimum unit of flash read data transfer. The E-Page 210, therefore, may be (but need not be) of a predetermined fixed size (such as 2 KB, for example) and determine the size of the payload (e.g., host data) of the ECC system. According to one embodiment, each F-Page 208 may be configured to fit a predetermined plurality of E-Pages 210 within its boundaries. For example, given 16 KB size F-Pages 208 and a fixed size of 2 KB per E-Page 210, eight E-Pages 210 fit within a single F-Page 208, as shown in FIG. 2. In any event, according to one embodiment, a power of 2 multiple of E-Pages 210, including ECC, may be configured to fit into an F-Page 208. Each E-Page 210 may comprise a data portion 214 and, depending on where the E-Page 210 is located, may also comprise an ECC portion 216. Neither the data portion 214 nor the ECC portion 216 need be fixed in size. The address of an E-Page uniquely identifies the location of the E-Page within the flash memory. For example, the E-Page's address may specify the flash channel, a particular die within the identified flash channel, a particular block within the die, a particular F-Page and, finally, the E-Page within the identified F-Page.

The E-Pages, data portions, and ECC portions need not be arranged according to the example arrangement of FIG. 2. For example, the data portion and ECC portion of each E-Page may be physically separated, so that the data portions are grouped together and the ECC portions are grouped together within an F-Page. Other arrangements of E-Pages, data portions, and ECC portions are possible in various embodiments. For example, in one embodiment, an F-Page may include just one E-Page.

To bridge between physical addressing on the data storage device and logical block addressing by the host, a logical page (L-Page) construct is introduced. An L-Page, denoted in FIG. 2 at reference numeral 212 may comprise the minimum unit of address translation used by the FMS. Each L-Page, according to one embodiment, may be associated with an L-Page number. The L-Page numbers of L-Pages 212, therefore, may be configured to enable the controller 202 to logically reference host data stored in one or more of the physical pages, such as the E-Pages 210. The L-Page 212 may also be utilized as the basic unit of compression. According to one embodiment, unlike F-Pages 208 and E-Pages 210, L-Pages 212 need not be fixed in size and may vary in size, due to variability in the compression of data to be stored. Since the compressibility of data varies, a 4 KB amount of data of one type may be compressed into a 2 KB L-Page while a 4 KB amount of data of a different type may be compressed into a 1 KB L-Page, for example. Due to such compression, therefore, the size of L-Pages may vary within a range defined by a minimum compressed size of, for example, 24 bytes to a maximum uncompressed size of, for example, 4 KB or 4 KB+. Other sizes and ranges may be implemented. As shown in FIG. 2, L-Pages 212 need not be aligned with the boundaries of E-Page 210. Indeed, L-Pages 212 may be configured to have a starting address that is aligned with an F-Page 208 and/or E-Page 210 boundary, but also may be configured to be unaligned with either of the boundaries of an F-Page 208 or E-Page 210. That is, an L-Page starting address may be located at a non-zero offset from either the start or ending addresses of the F-Pages 208 or the start or ending addresses of the E-Pages 210, as shown in FIG. 2. As the L-Pages 212 are not fixed in size and may be smaller than the fixed-size E-Pages 210, more than one L-Page 212 may fit within a single E-Page 210. Similarly, as the L-Pages 212 may be larger in size than the E-Pages 210, L-Pages 212 may span more than one E-Page, and may even cross the boundaries of F-Pages 210, shown in FIG. 2 at numeral 217. That is, one or more of the plurality of L-Pages 212 may be configured to span from a physical page (e.g., E-Page) in a first F-Page to a physical page (e.g., E-Page) in a second F-Page. As detailed further below, L-Pages 212 may also span block boundaries, such as would be the case wherein one of the boundaries 217 of FIG. 2 represented a block boundary.

For example, where the LBA size is 512 or 512+ bytes, a maximum of, for example, eight sequential LBAs may be packed into a 4 KB L-Page 212, given that an uncompressed L-Page 212 may be 4 KB to 4 KB+. It is to be noted that, according to one embodiment, the exact logical size of an L-Page 212 is unimportant as, after compression, the physical size may span from few bytes at minimum size to thousands of bytes at full size. For example, for 4 TB SSD device, 30 bits of addressing may be used to address each L-Page 212 to cover for an amount of L-Pages that could potentially be present in such a SSD.

Figure 3:
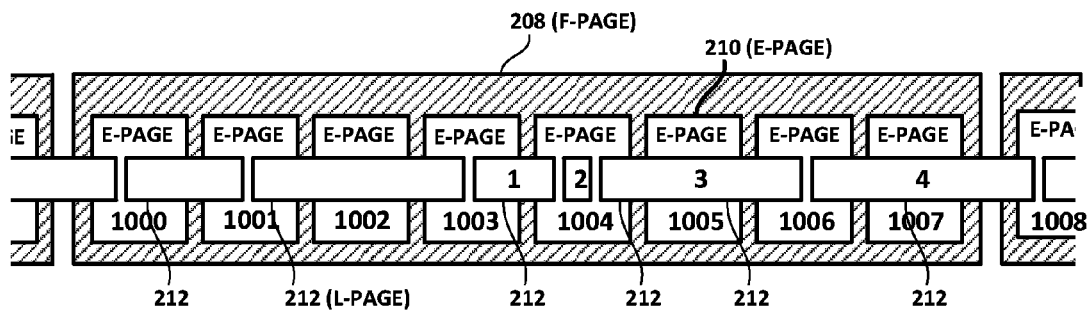
FIG. 3 shows a logical-to-physical address translation map and illustrative entries thereof, according to one embodiment.
Figure 3:
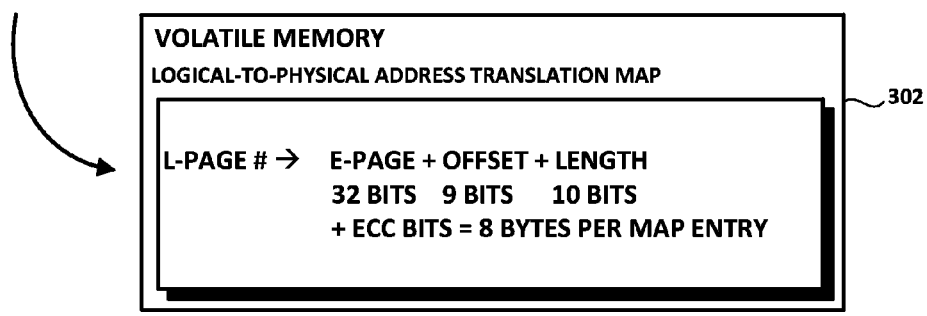

FIG. 3 shows a logical-to-physical address translation map and illustrative entries thereof, according to one embodiment. As the host data is referenced by the host in L-Pages 212 and as the data storage device stores the L-Pages 212 in one or more contiguous E-Pages 210, a logical-to-physical address translation map is required to enable the controller 202 to associate an L-Page number of an L-Page 212 to one or more E-Pages 210. Such a logical-to-physical address translation map is shown in FIG. 3 at 302 and, in one embodiment, is a linear array having one entry per L-Page 212, indexed by the L-Page number. Such a logical-to-physical address translation map 302 may be stored in a volatile memory, such as a DRAM or SRAM. The logical-to-physical address translation map 302 may be, according to one embodiment, configured to enable the controller 202 to determine the exact location, within one or more physical pages (e.g., E-Pages), of the data referenced by each L-Page. That the complete and exact location of the L-Page in non-volatile memory may be specified by its corresponding L-Page number entry in the logical-to-physical address translation map 302, no scanning or address reconstruction need be carried out to access the referenced L-Page. Avoiding the need for scanning for the starting address of a logical page speeds up data operations and also simplifies the controller logic (hardware, firmware or a combination of both) by eliminating the scanning code.

As the address translation map 302 may be stored in a volatile memory, it may need to be rebuilt each time upon startup of the data storage device (e.g., the SSD) to ensure coherency with the non-volatile flash memory. Indeed, upon startup, the logical-to-physical map 302 may need to be rebuilt, to ensure that there is a valid L-Page number entry therein that points to each valid L-Page stored in non-volatile memory.

FIG. 3 also shows the entries in the logical-to-physical address translation map for four different L-Pages 212, which L-Pages 212 in FIG. 3 are associated with L-Page numbers denoted as L-Page 1, L-Page 2, L-Page 3 and L-Page 4. According to one embodiment, each L-Page stored in the data storage device may be pointed to by a single and unique entry in the logical-to-physical address translation map 302. Accordingly, in the example being developed herewith, four entries are shown. As shown at 302, each entry in the map 302 may comprise information for an L-Page that is indexed by an L-Page number. That information may comprise an identification of the physical page (e.g., E-Page) containing the start address of the L-Page being referenced, the offset (which may be a zero or a non-zero value) of the start address within the physical page (e.g., E-Page) and the length of the L-Page. In addition, a plurality of ECC bits may provide error correction functionality for the map entry. For example, and as shown in FIG. 3, and assuming an E-Page size of 2 KB, L-Page 1 may be referenced in the logical-to-physical address translation map 302 as follows: E-Page 1003, offset 800, length 1624, followed by a predetermined number of ECC bits (not shown). That is, in physical address terms, the start of L-Page 1 is within (not aligned with) E-Page 1003, and is located at an offset from the starting physical location of the E-Page 1003 that is equal to 800 bytes. Compressed L-Page 1, furthermore, extends 1,624 bytes, thereby crossing an E-Page boundary to E-Page 1004. Therefore, E-Pages 1003 and 1004 each store a portion of the L-Page 212 denoted by L-Page number L-Page 1. Similarly, the compressed L-Page referenced by L-Page number L-Page 2 is stored entirely within E-Page 1004, and begins at an offset therein of 400 bytes and extends only 696 bytes within E-Page 1004. The compressed L-Page associated with L-Page number L-Page 3 starts within E-Page 1004 at an offset of 1,120 bytes and extends 4,096 bytes past E-Page 1005 and into E-Page 1006. Therefore, the L-Page associated with L-Page number L-Page 3 spans a portion of E-Page 1004, all of E-Page 1005 and a portion of E-Page 1006. Finally, the L-Page associated with L-Page number L-Page 4 begins within E-Page 1006 at an offset of 1,144 bytes, and extends 3,128 bytes to fully span E-Page 1007, crossing an F-Page boundary into E-Page 1008 of the next F-Page. In one embodiment, there may be 24 bytes of metadata included in each L-Page that are not included in the length specified (as reflected in the example being developed). In other embodiments, the metadata may be included in the L-Page length.

Collectively, each of these constituent identifier fields (E-Page, offset, length and ECC) making up each entry of the logical-to-physical address translation map 302 may be, for example, 8 bytes in size. That is, for an exemplary 4 TB drive, the address of the E-Page may be 32 bits in size, the offset may be 12 bits (for E-Page data portions up to 4 KB) in size, the length may be 10 bits in size and the ECC field may be provided. Other organizations and bit-widths are possible. Such an 8 byte entry may be created each time an L-Page is written or modified, to enable the controller 202 to keep track of the host data, written in L-Pages, within the flash storage. This 8-byte entry in the logical-to-physical address translation map may be indexed by an L-Page number or LPN. In other words, according to one embodiment, the L-Page number functions as an index into the logical-to-physical address translation map 302. It is to be noted that, in the case of a 4 KB sector size, the LBA is the same as the LPN. The LPN, therefore, may constitute the address of the entry within the volatile memory. When the controller 202 receives a read command from the host 218, the LPN may be derived from the supplied LBA and used to index into the logical-to-physical address translation map 302 to extract the location of the data to be read in the flash memory. When the controller 202 receives a write command from the host, the LPN may be constructed from the LBA and the logical-to-physical address translation map 302 may be modified. For example, a new entry therein may be created. Depending upon the size of the volatile memory storing the logical-to-physical address translation map 302, the LPN may be stored in a single entry or broken into, for example, a first entry identifying the E-Page containing the starting address of the L-Page in question (plus ECC bits) and a second entry identifying the offset and length (plus ECC bits). According to one embodiment, therefore, these two entries may together correspond and point to a single L-Page within the flash memory. In other embodiments, the specific format of the logical-to-physical address translation map entries may be different from the examples shown above.

Figure 4:
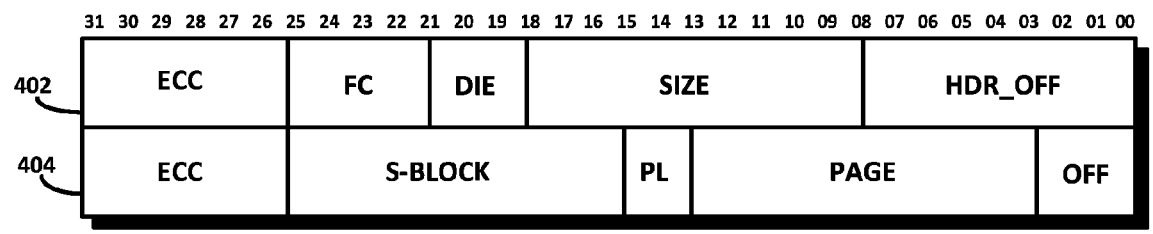
FIG. 4 shows an exemplary organization of an entry of a logical-to-physical address translation map, according to one embodiment.

Depending upon the size of the volatile memory storing the address translation map 302, the LPN may be stored in a single entry or broken into, for example, two entries, as shown in FIG. 4. In FIG. 4 and according to an embodiment, a first entry 402 may identify the physical page (e.g., E-Page) containing the starting address of the L-Page (plus ECC bits) by Flash Channel (FC) number, die number, size of the L-Page and offset into the E-Page for the L-Page header (HDR_OFF) and a second entry 404 may identify the S-block, plane, and length (plus ECC bits). According to one embodiment, the FC, Die, Block, PL, Page and OFF entries together may define a physical address in the flash memory of an E-Page. The HDR_OFF may define the offset into the specified E-Page of the starting address of the L-Page and the Size field may specify the size of the L-Page, to fully qualify the starting address and extent of the L-Page associated with the L-Page number index into the logical-to-physical address translation map 302. In other embodiments, the specific format of the logical-to-physical address translation map entries may be different from the examples shown above.

S-Journals

As the logical-to-physical address translation map 302 may be stored in a volatile memory, it may need to be rebuilt upon startup or any other loss of power to the volatile memory. This, therefore, requires some mechanism and information to be stored in a non-volatile memory that will enable the controller 202 to reconstruct the logical-to-physical address translation map 302 before the controller can "know" where the L-Pages are stored in the non-volatile memory after startup or after a power-fail event. According to one embodiment, such mechanism and information are embodied in a construct that may be called a System Journal, or S-Journal. According to one embodiment, the controller 202 may be configured to maintain, in the plurality of non-volatile memory devices (e.g., in one or more of the blocks 206 in one or more die, channel or plane), a plurality of S-Journals defining physical-to-logical address correspondences. According to one embodiment, each S-Journal covers a pre-determined range of physical pages (e.g., E-Pages). According to one embodiment, each S-Journal may comprise a plurality of journal entries, with each entry being configured to associate one or more physical pages, such as E-Pages, to the L-Page number of each L-Page. According to one embodiment, each time the controller 202 restarts or whenever the logical-to-physical address translation map 302 is to be rebuilt either partially or entirely, the controller 202 reads the S-Journals and, from the information read from the S-Journal entries, rebuilds the logical-to-physical address translation map 302.

Figure 5:
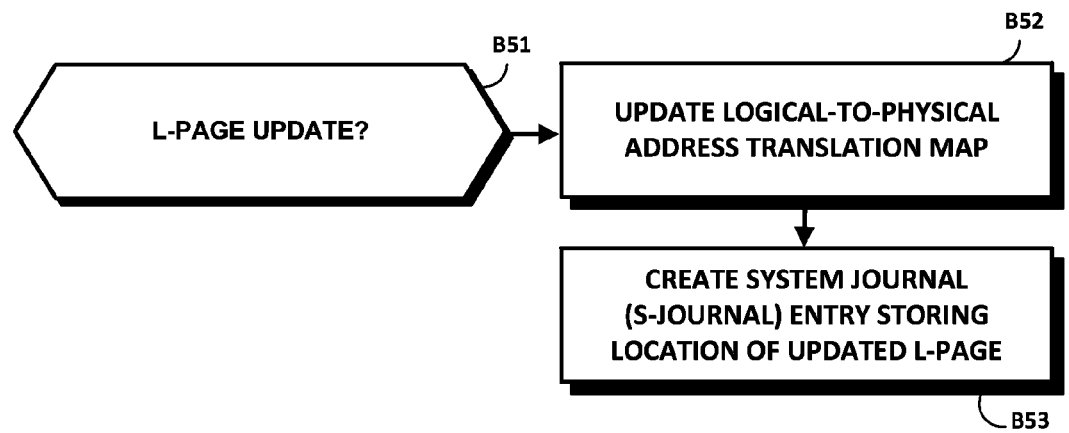
FIG. 5 shows aspects of a method for updating a logical-to-physical address translation map and for creating an S-Journal entry, according to one embodiment.

FIG. 5 shows aspects of a method for updating a logical-to-physical address translation map and for creating an S-Journal entry, according to one embodiment. As shown therein, to ensure that the logical-to-physical address translation map 302 is kept up-to-date, whenever an L-Page is written or otherwise updated as shown at block B51, the logical-to-physical address translation map 302 may be updated as shown at B52. As shown at B53, an S-Journal entry may also be created, storing therein information pointing to the location of the updated L-Page. In this manner, both the logical-to-physical address translation map 302 and the S-Journals are updated when new writes occur (e.g., as the host issues writes to non-volatile memory, as garbage collection/wear leveling occurs, etc.). Write operations to the non-volatile memory devices to maintain a power-safe copy of address translation data may be configured, therefore, to be triggered by newly created journal entries (which may be just a few bytes in size) instead of re-saving all or a portion of the logical-to-physical address translation map, such that Write Amplification (WA) is reduced. The updating of the S-Journals ensures that the controller 202 can access a newly updated L-Page and that the logical-to-physical address translation map 302 may be reconstructed upon restart or other information-erasing power event affecting the volatile memory in which the logical-to-physical address translation map is stored. Moreover, in addition to their utility in rebuilding the logical-to-physical address translation map 302, the S-Journals are useful in enabling effective Garbage Collection (GC). Indeed, the S-Journals may contain the last-in-time update to all L-Page numbers, and also may contain stale entries, entries that do not point to a valid L-Page.

Updating the Logical-to-Physical Address Translation Map

Figure 6:
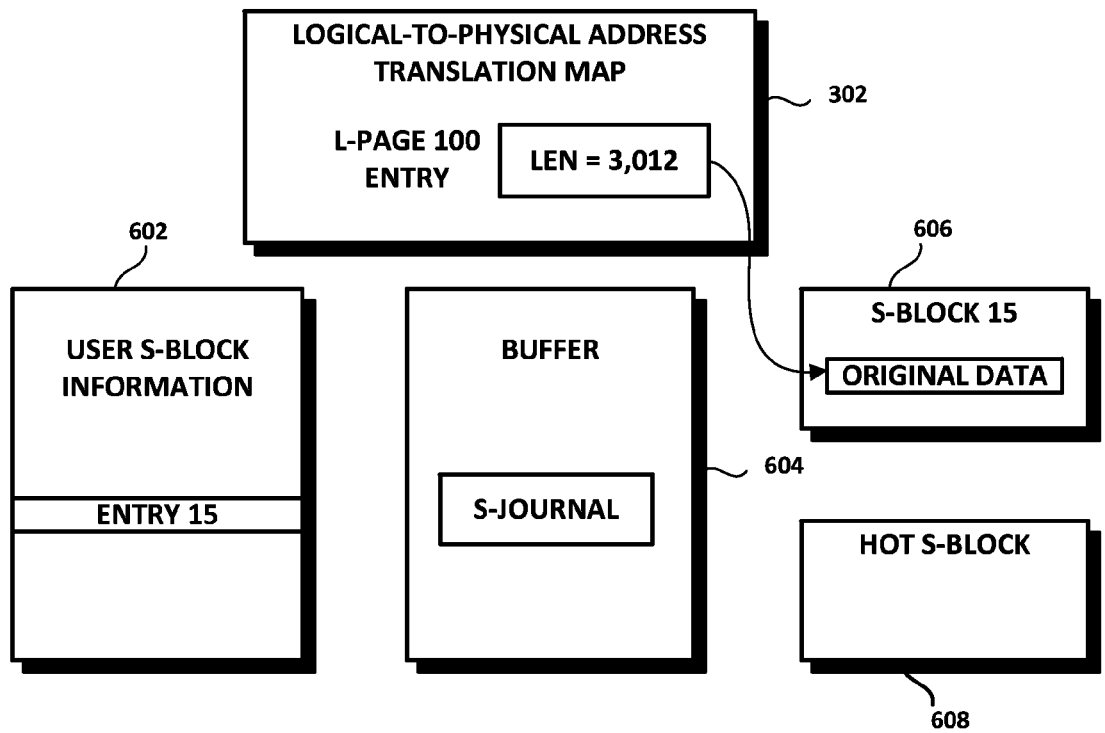
FIG. 6 is a block diagram illustrating aspects of a method of updating the logical-to-physical address translation map, according to one embodiment.

FIGS. 6-9 are block diagrams illustrating aspects of a method of updating the logical-to-physical address translation map 302, according to one embodiment. As shown in FIG. 6, a logical-to-physical address translation map 302, according to one embodiment, may contain an entry (e.g., a location of an L-Page) for L-Page 100, which has a length of 3,012 bytes. In this example, L-Page 100 is stored in S-Block 15, as shown at 606. A buffer 604 (such as a static random access memory (SRAM)) in or coupled to the controller 202 may store the S-Journal that contains the physical-to-logical information for S-Block 15 in which the L-Page 100 resides. What is shown in the buffer 604 may actually reside in DRAM in some embodiments. The User S-Block Information 602, whose entries are indexed by S-Block, may comprise for each S-Block, among other information regarding the S-Block, the (e.g., exact or approximate) size of the free or used space in the S-Block. As shown in FIG. 6, the entry in the User S-Block Information 602 for S-Block 15 is shown. FIG. 6 shows an illustrative state of these constituent functional blocks before an update to L-Page 100 is processed by the controller 202.

Figure 7:
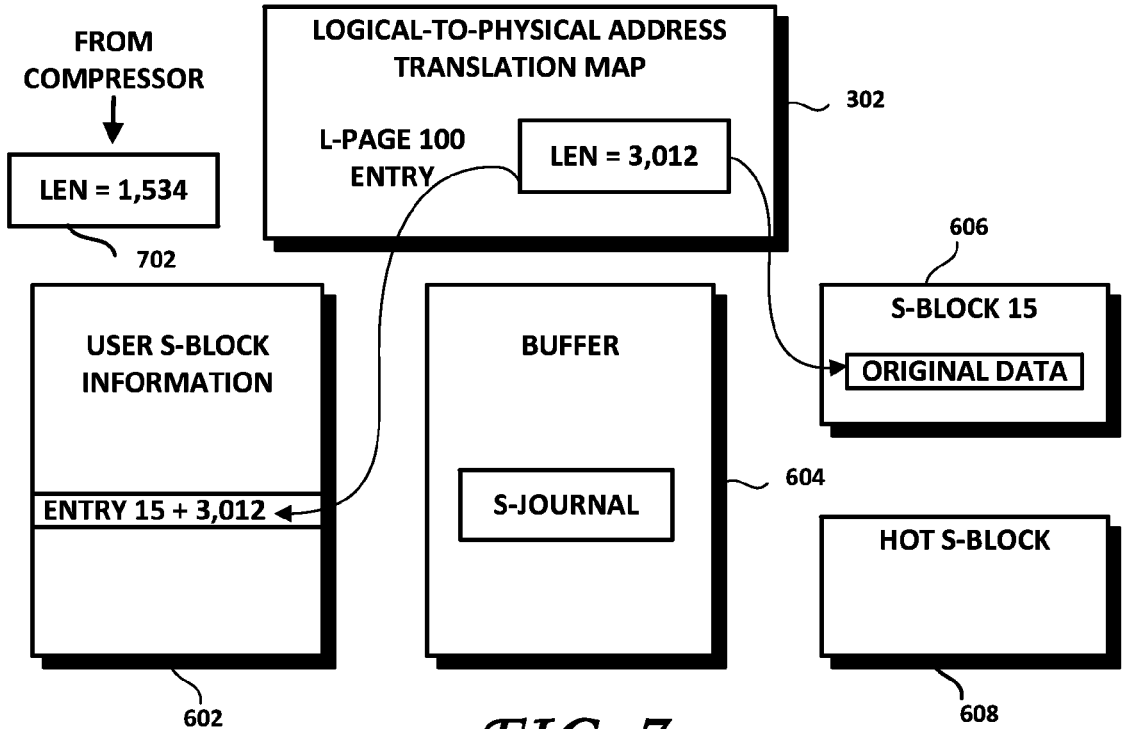
FIG. 7 is a block diagram illustrating further aspects of a method of updating the logical-to-physical address translation map, according to one embodiment.

As shown in FIG. 7 at 702, an updated L-Page may be received, with a new length of 1,534 bytes. Responsive to the receipt of the updated L-Page 100, the L-Page 100 information may be fetched from the logical-to-physical address translation map 302 and the length of the (now obsolete) L-Page 100 may be extracted therefrom and used to correspondingly and precisely increase the tracked free space value of S-Block 15. Therefore, the User S-Block Information 602 may be updated with data indicating that S-Block 15 now has 3,012 additional bytes of free space, now that the original data for L-Page 100 is stale (obsolete). It is to be noted that instead of tracking free space, the used space within an S-Block may be tracked and the free space therein derived may be from the tracked used space.

Figure 8:
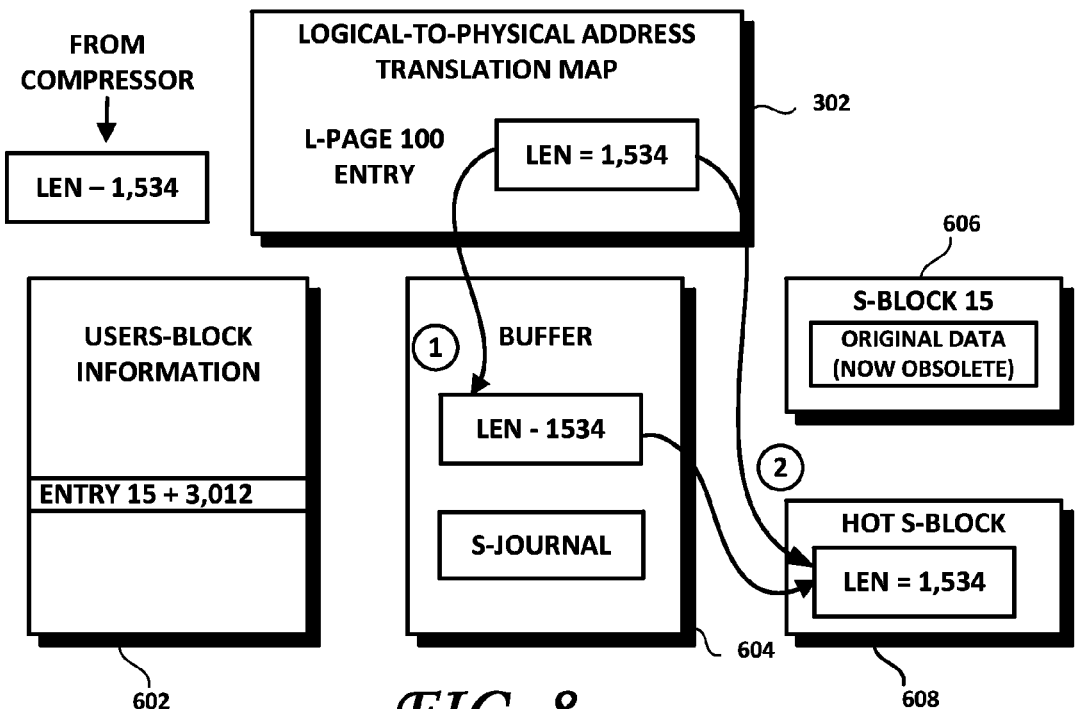
FIG. 8 is a block diagram illustrating still further aspects of a method of updating the logical-to-physical address translation map, according to one embodiment.

As shown in FIG. 8, the logical-to-physical address translation map 302 may now be updated to accommodate the updated L-Page. For example, the length information is now 1,534 bytes. Thereafter, the S-Journal in the buffer 604 for the particular portion of S-Block 15 where the update occurs may now be updated with the new L-Page information, including length information and the L-Page newly received from, for example, a compressor may be read into the buffer 604. While the new L-Page is in the buffer, the entry for L-Page 100 in the logical-to-physical address translation map 302 may temporarily reflect its location in the buffer, as shown by the arrow labeled "1". Later, the updated L-Page 100 may be flushed to the Hot S-Block 608, at the E-Page address and offset specified by the newly-created entry in the now updated S-Journal still in the buffer 604. The mapping table entry in the logical-to-physical address translation map 302 is updated to reflect the physical E-Page address and offset of the L-Page's final destination in non-volatile memory, as suggested by arrow "2".

Figure 9:
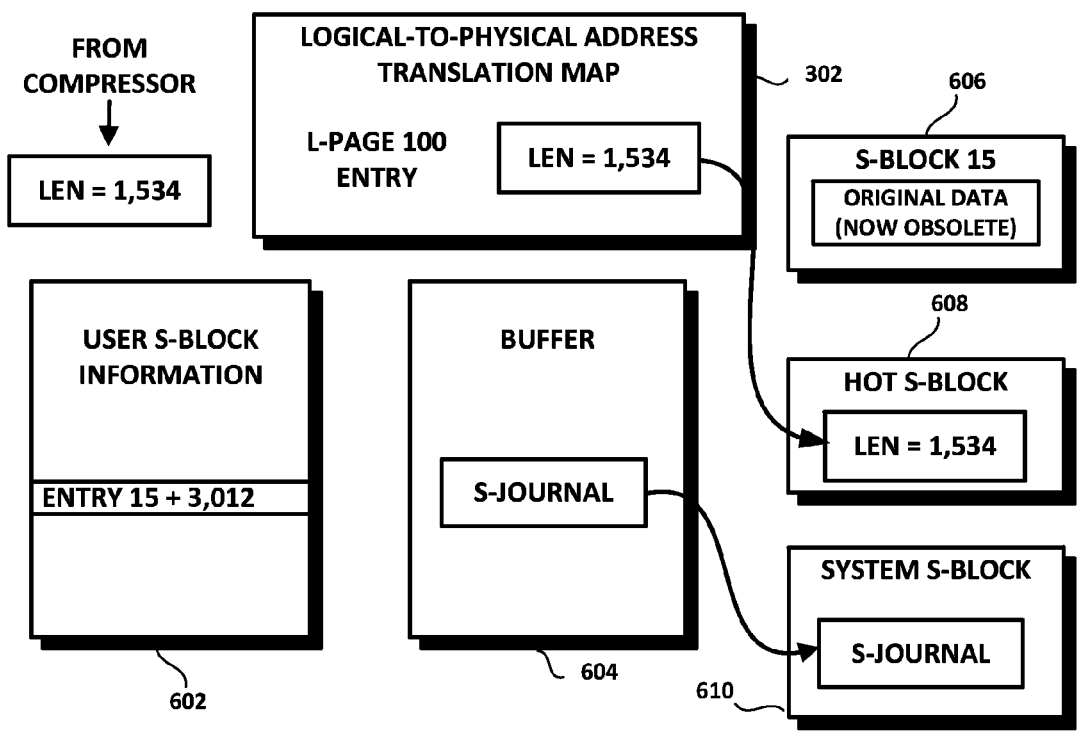
FIG. 9 is a block diagram illustrating yet further aspects of a method of updating the logical-to-physical address translation map, according to one embodiment.

As shown in FIG. 9, at some later point in time such as, for example, after accumulating a sufficient number of new entries, the S-Journal in the volatile memory buffer 604 may be written out to non-volatile memory, such as to the System S-Block 610. The System S-Block 610 may be a portion of the flash memory allocated by the controller firmware to store S-Journals. The saving of the S-Journal in non-volatile memory enables the later reconstruction of the logical-to-physical address translation map 302 in volatile memory, as needed.

Figure 10:
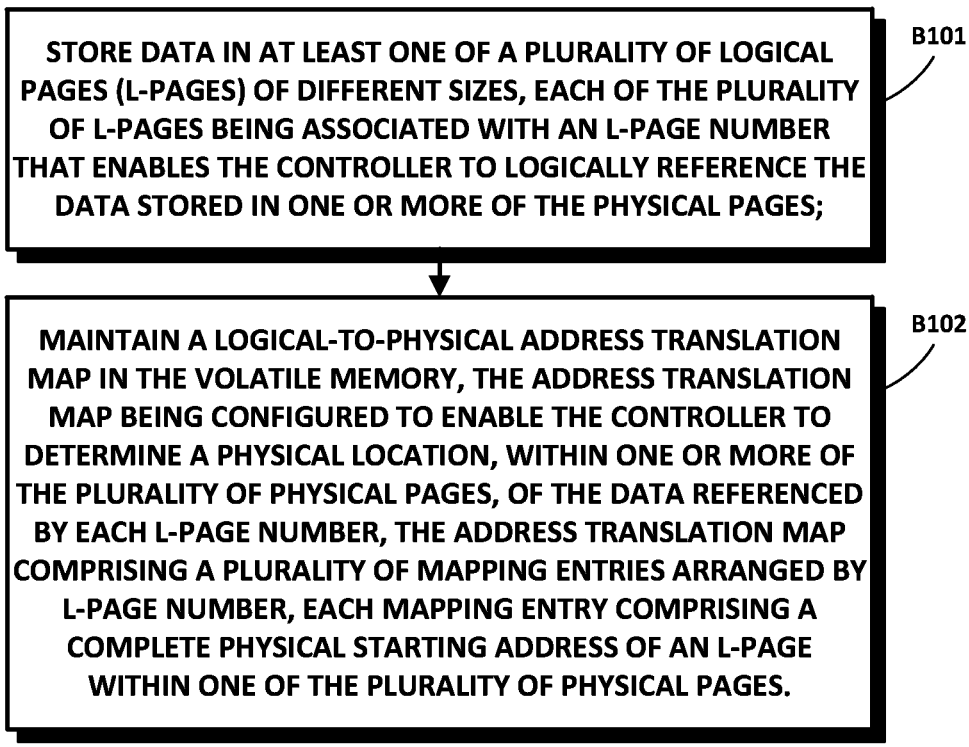
FIG. 10 is a flowchart of a method of controlling a data storage device comprising a volatile memory and a plurality of non-volatile memory devices, according to one embodiment.

FIG. 10 is a flowchart of a method of controlling a data storage device. According to one embodiment, the data storage device may comprise a volatile memory and a plurality of non-volatile memory devices. Each of the plurality of non-volatile devices may be configured to store a plurality of physical pages, each of which being stored at a predetermined physical location within the plurality of non-volatile memory devices. As shown at B101 in FIG. 10 and according to one embodiment, the method may comprise storing data in at least one of a plurality of logical pages (L-Pages) of different sizes, each of the plurality of L-Pages being associated with an L-Page number that enables the controller 202 to logically reference the data stored in one or more of the physical pages. A logical-to-physical address translation map may be maintained in the volatile memory, as shown at block B102. The logical-to-physical address translation map 302 may be configured, as shown and discussed above, to enable the controller 202 to determine a physical location, within one or more of the plurality of physical pages 206, of the data referenced by each L-Page number. The logical-to-physical address translation map 302 may comprise a plurality of mapping entries arranged by L-Page number, with each mapping entry comprising a complete physical starting address of an L-Page within one of the plurality of physical pages.

According to one embodiment, maintaining comprises configuring the address translation map 302 such that each mapping entry comprises the size of the L-Page associated with the L-Page number of the mapping entry. According to one embodiment, such maintaining may also comprise, upon an update to one of the plurality of L-Pages 212, updating the logical-to-physical address translation map 302 with a single entry configured to associate an L-Page number of the updated L-Page 212 to a new physical location. The logical-to-physical address translation map 302 may also be updated with the size of the updated L-Page 212.

As shown in FIGS. 2 and 3 and according to one embodiment, one or more of the plurality of L-Pages 212 may be stored at a starting address that is un-aligned with a physical page starting or ending address boundary. Similarly, the ending address of one or more of the plurality of L-Pages 212 may be un-aligned with a physical page starting or ending address boundary. As also shown in FIGS. 2 and 3, data may be stored in one or more L-Pages 212 that spans more than one physical page. For example, an L-Page 212 may span from a first F-Page 208 to a second F-Page 208. The size of the F-Page 208 may correspond to a minimum unit of program for the data storage device. According to one embodiment and as described above, one or more L-Pages 212, may be configured to be of a size such that more than one fits within a single physical page. One or more of the physical pages may comprise an error correction page (E-Page) comprising a data portion and an error correction code portion. As shown in FIG. 2, compression may enable more than one L-Page 212 to fit within a single E-Page 210. Indeed, an L-Page 212 may be configured (by, for example, a host) to be uncompressed or compressed to a predetermined minimum compressed size (24 bytes, for example).

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
an array of flash memory devices comprising a plurality of blocks, each comprising a plurality of physical pages;
a controller coupled to the array of memory devices and configured to program and read data from the array of memory devices responsive to data access commands from a host, wherein the controller is configured to:
store data in a plurality of logical pages (L-Pages) of different sizes, each of the plurality of L-Pages being associated with an L-Page number that is configured to enable the host to logically reference data stored in one or more of the plurality of physical pages;
maintain a logical-to-physical address translation map configured to enable the controller to determine a location, within one or more physical pages, of the data referenced by each L-Page number,
wherein the translation map comprises a plurality of mapping entries arranged by L-Page numbers, each mapping entry comprising:
a complete starting physical address of an L-Page within one of the plurality of physical pages, and
a size of the L-Page associated with the L-Page number of the mapping entry;
maintain a system journal (S-Journal) that includes a plurality of journal entries, wherein each of the plurality of journal entries is configured to associate one or more of the plurality of physical pages to each of the plurality of L-pages; and
create a journal entry directly into one of the plurality of journals each time a logical page in the logical-to-physical address translation map is updated.

2. The data storage device of claim 1, wherein the controller is further configured to, upon an update to one of the plurality of L-Pages, update the translation map with a single entry to associate the updated L-Page to a new physical location.

3. The data storage device of claim 2, wherein the controller is further configured to update the translation map with a size of the updated L-Page.

4. The data storage device of claim 1, wherein at least one of the plurality of L-Pages is configured to have a starting address that is un-aligned with a physical page address boundary.

5. The data storage device of claim 1, wherein at least one of the plurality of L-Pages is configured to have an ending address that is un-aligned with a physical page address boundary.

6. The data storage device of claim 1, wherein at least one of the plurality of L-Pages is configured to span more than one physical page.

7. The data storage device of claim 1, wherein at least one of the plurality of L-Pages is configured to be of a size such that more than one L-Page fits within a single physical page.

8. The data storage device of claim 1, wherein each of the plurality of blocks comprises a plurality of F-Pages and wherein at least one of the plurality of L-Pages is configured to span from a physical page in a first F-Page to a physical page in a second F-Page.

9. The data storage device of claim 8, wherein at least one of the plurality of F-Pages is of a size corresponding to a minimum unit of program for the data storage device.

10. The data storage device of claim 1, wherein at least one of the plurality of L-Pages is configured to be configured by a host.

11. The data storage device of claim 1, wherein at least one of the plurality of L-Pages is configured to have a size ranging from a first uncompressed size to a predetermined minimum compressed size.

12. The data storage device of claim 1, wherein at least one of the plurality of physical pages comprises an error correction page (E-Page) comprising a data portion and an error correction code portion.

13. A method of controlling a data storage device comprising a volatile memory and a plurality of non-volatile memory devices, each of the plurality of non-volatile devices being configured to store a plurality of physical pages, each of the physical pages being stored at a predetermined physical location within the plurality of non-volatile memory devices, the method comprising:
  storing data in at least one of a plurality of logical pages (L-Pages) of different sizes, each of the plurality of L-Pages being associated with an L-Page number that enables the controller to logically reference the data stored in one or more of the physical pages; and
  maintaining a logical-to-physical address translation map in the volatile memory, the address translation map being configured to enable the controller to determine a physical location, within one or more of the plurality of physical pages, of the data referenced by each L-Page number, the address translation map comprising a plurality of mapping entries arranged by L-Page number, each mapping entry comprising a complete physical starting address of an L-Page within one of the plurality of physical pages and a size of the L-Page associated with the L-Page number of the mapping entry;
  maintaining a system journal (S-Journal) in one of the plurality of non-volatile memory devices that includes a plurality of journal entries, wherein each of the plurality of journal entries is configured to associate one or more of the plurality of physical pages to each of the plurality of L-pages; and
  creating a journal entry directly into one of the plurality of journals each time a logical page in the logical-to-physical address translation map is updated.

14. The method of claim 13, wherein maintaining comprises, upon an update to one of the plurality of L-Pages, updating the address translation map with a single entry configured to associate an L-Page number of the updated L-Page to a new physical location.

15. The method of claim 14, wherein maintaining further comprises updating the address translation map with a size of the updated L-Page.

16. The method of claim 13, wherein storing further comprises storing at least one of the plurality of L-Pages at a starting address that is un-aligned with a physical page starting or ending address boundary.

17. The method of claim 13, wherein storing comprises storing at least one of the plurality of L-Pages such that an ending address thereof is un-aligned with a physical page starting or ending address boundary.

18. The method of claim 13, wherein storing comprises storing the data in at least one L-Page that spans more than one physical page.

19. The method of claim 13, wherein storing comprises storing the data in at least one L-Page that is configured to be of a size such that more than one L-Page fits within a single physical page.

20. The method of claim 13, wherein each of the plurality of blocks comprises a plurality of F-Pages and wherein storing comprises storing at least one of the plurality of L-Pages in such a manner as to span from a physical page in a first F-Page to a physical page in a second F-Page.

21. The method of claim 13, wherein at least one of the plurality of F-Pages is of a size corresponding to a minimum unit of program for the data storage device.

22. The method of claim 13, wherein at least one of the plurality of L-Pages is configured by a host.

23. The method of claim 13, wherein storing comprises compressing at least one of the plurality of L-Pages to a size ranging from a first uncompressed size to a predetermined minimum compressed size.

24. The method of claim 13, wherein at least one of the plurality of physical pages comprises an error correction page (E-Page) comprising a data portion and an error correction code portion.

25. A solid state drive controller, comprising:
  a buffer configured to couple to an array of flash memory devices comprising a plurality of blocks, each comprising a plurality of physical pages; and
  a processor coupled to the buffer, the processor being configured to program and read data from the array of flash memory devices responsive to data access commands from a host, wherein the processor is further configured to:
    store data in a plurality of logical pages (L-Pages) of different sizes, each of the plurality of L-Pages being associated with an L-Page number that is configured to enable the host to logically reference data stored in one or more of the plurality of physical pages; and
    maintain a logical-to-physical address translation map configured to enable the processor to determine a location, within one or more physical pages, of the data referenced by each L-Page number, wherein the translation map comprises a plurality of mapping entries arranged by L-Page numbers, each mapping entry comprising a complete starting physical address of an L-Page within one of the plurality of physical pages and a size of the L-Page associated with the L-Page number of the mapping entry;

maintain a system journal (S-Journal) that includes a plurality of journal entries, wherein each of the plurality of journal entries is configured to associate one or more of the physical pages to each of the plurality of L-pages; and create a journal entry directly into one of the plurality of journals each time a logical page in the logical-to-physical address translation map is updated.

26. The solid state drive controller of claim 25, wherein the processor is further configured to, upon an update to one of the plurality of L-Pages, update the address translation map with a single entry to associate the updated L-Page to a new physical location.

27. The solid state drive controller of claim 26, wherein the processor is further configured to update the address translation map with a size of the updated L-Page.

28. The solid state drive controller of claim 25, wherein at least one of the plurality of L-Pages is configured to have a starting address that is un-aligned with a physical page address boundary.

29. The solid state drive controller of claim 25, wherein at least one of the plurality of L-Pages is configured to have an ending address that is un-aligned with a physical page address boundary.

30. The solid state drive controller of claim 25, wherein at least one of the plurality of L-Pages is configured to span more than one physical page.

31. The solid state drive controller of claim 25, wherein at least one of the plurality of L-Pages is configured to be of a size such that more than one L-Page fits within a single physical page.

32. The solid state drive controller of claim 25, wherein each of the plurality of blocks comprises a plurality of F-Pages and wherein at least one of the plurality of L-Pages is configured to span from a physical page in a first F-Page to a physical page in a second F-Page.

33. The solid state drive controller of claim 32, wherein at least one of the plurality of the F-Pages is of a size corresponding to a minimum unit of program for the drive controller.

34. The solid state drive controller of claim 25, wherein at least one of the plurality of L-Pages is configured to be configured by a host.

35. The solid state drive controller of claim 25, wherein at least one of the plurality of L-Pages is configured to have a size ranging from a first uncompressed size to a predetermined minimum compressed size.

36. The solid state drive controller of claim 25, wherein at least one of the plurality of physical pages comprises an error correction page (E-Page) comprising a data portion and an error correction code portion.

* * * * *